United States Patent
Tatebayashi et al.

[19]

[11] Patent Number: 6,034,618
[45] Date of Patent: Mar. 7, 2000

[54] DEVICE AUTHENTICATION SYSTEM WHICH ALLOWS THE AUTHENTICATION FUNCTION TO BE CHANGED

[75] Inventors: Makoto Tatebayashi, Takarazuka; Natsume Matsuzaki, Minou; Yoshihisa Fukushima, Osaka; Koichi Hirayama; Atsushi Ishihara, both of Yokohama, all of Japan

[73] Assignees: Matsushita Electric Industrial Co., Ltd., Osaka; Kabushiki Kaisha Toshiba, Kanagawa-ken, both of Japan

[21] Appl. No.: 08/940,076

[22] Filed: Sep. 29, 1997

[30] Foreign Application Priority Data

Oct. 31, 1996 [JP] Japan .................................. 8-290372

[51] Int. Cl.[7] .................................................. G06F 11/00
[52] U.S. Cl. ............................ 340/825.34; 340/825.3; 340/505; 340/10.1; 709/229; 713/200; 713/201; 713/202; 380/3; 380/4; 380/25
[58] Field of Search ........................... 340/825.34, 825.3, 340/825.54, 505, 10.1; 395/186, 188.01; 705/18, 44; 707/9; 711/163, 164; 380/3, 4, 5, 9, 23, 25; 455/410, 411; 1/1; 709/229; 713/200, 201, 202

[56] References Cited

U.S. PATENT DOCUMENTS 5,481,611  1/1996  Owens et al. .............................. 380/25

*Primary Examiner*—Brian Zimmerman
*Assistant Examiner*—Yves Dalencourt
*Attorney, Agent, or Firm*—Price, Gess & Ubell

[57] ABSTRACT

The decoder apparatus 90 generates a random number R1 for authenticating the optical disc drive apparatus 70 and sends it to the optical disc drive apparatus 70 as the challenge data CHA1. The optical disc drive apparatus 70 selects one out of the sixteen claimant functions stored in the claimant function unit 722 and calculates the function value fi(CHA1) which it sends to the decoder apparatus 90 as the response data RES1. The decoder apparatus 90 compares the response data RES1 with sixteen function values f1(R1) to f16(R1) that are obtained using the sixteen verification functions stored in the verification function unit 922, and authenticates the optical disc drive apparatus 70 when at least one of the function values matches the response data RES1.

28 Claims, 11 Drawing Sheets

FIG. 8

| CLAIMANT FUNCTION (VERIFICATION FUNCTION) NUMBER k | PRIORITY RANKING OF SELECTION |
|---|---|
| 1 | 9 |
| 2 | 4 |
| 3 | 12 |
| 4 | 14 |
| 5 | 1 |
| 6 | 10 |
| 7 | 5 |
| 8 | 16 |
| 9 | 2 |
| 10 | 15 |
| 11 | 3 |
| 12 | 7 |
| 13 | 11 |
| 14 | 6 |
| 15 | 13 |
| 16 | 8 |

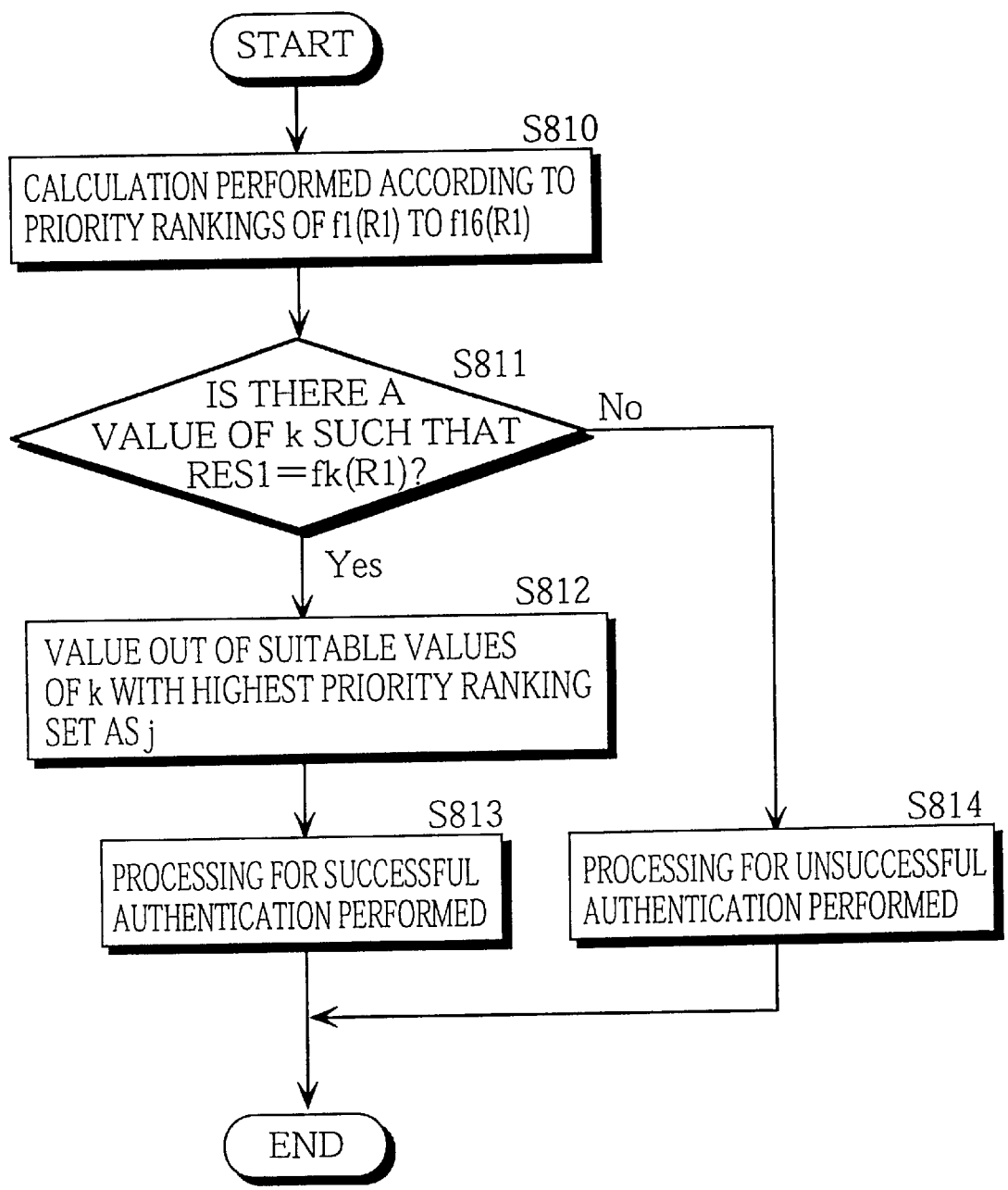

DEVICE AUTHENTICATION SYSTEM WHICH ALLOWS THE AUTHENTICATION FUNCTION TO BE CHANGED

BACKGROUND OF THE INVENTION

1. Field of the Invention

The present invention relates to a device authentication system in which a first device verifies the authenticity of a second device to which it is connected, and especially to a device authentication system in challenge-response format that uses an encryption technique.

2. Description of the Prior Art

Device authentication systems in which one device verifies the authenticity of others before commencing communication are required to prevent the illegal copying or alteration of digital information that is transmitted between a plurality of devices connected by communication paths.

As one example, a production such as a movie may be digitized, compressed, and stored as a digital production on an optical disc. This digital production is then read as an electric signal by an optical disc reproduction apparatus, decompressed by a decompression apparatus, and converted into an analog signal by an AV (Audio Video) reproduction apparatus, before being reproduced.

In the above example, the optical disc reproduction apparatus and the decompression apparatus are provided as separate devices, with data communication being performed between these devices on a digital communication path. When doing so, a third party may use a digital information recording apparatus to copy the data transmitted on the communication path without the producer's consent. The third party may then proceed to produce illegal copies of the movie production using a digital information copying apparatus, and by doing so violate the producer's copyright over the production. As a result, it is necessary to prevent the illegal copying of digital information which is transmitted on a communication path, and to prevent illegal alteration and redistribution of the digital information.

Personal computers that include optical disc reproduction apparatuses and decompression apparatuses as peripherals have become increasingly widespread, with the standard system configuration being such that these peripherals are interconnected with a computer bus as the communication path. While it is commonplace for peripheral circuitry and device specifications to remain secret from the public, the electrical characteristics and signal formats of computer buses are usually revealed to the public, making the illegal copying and alteration of digital information transmitted on such communication paths a major problem.

A variety of device authentication systems have hitherto been developed. The most representative of these are authentication systems that use encrypted communication. In such systems, the transmitter verifies the authenticity of the receiver using encrypted communication, and only proceeds to transmit the desired data to receivers that have been successfully verified, thereby preventing unauthorized devices from receiving the data. It should be noted here that since the receiver needs to lay claim to its authenticity, it is generally referred to as the "claimant", while the transmitter needs to verify the authenticity of the claimant, and so is referred to as the "verifier".

There have also been cases where content (software) suppliers and hardware manufacturers have cooperated to create predetermined standards for use by devices related to the recording and reproduction of optical discs. Here, the issue is whether devices conform to the predetermined standard. Accordingly, the "verification of authenticity" described above is performed by judging whether a device conforms to the predetermined standard.

An example of a conventional device authentication system is the authentication method taught by the ISO/IEC 9798-2 Standard (International Organization for Standardization).

This technique is based on the claimant having a secret function called an authentication function which it uses to prove its authenticity to the verifier without transmitting the authentication function itself. In this setup, the verifier selects data (called "challenge data") and sends this to the claimant. The claimant then converts the challenge data using the authentication function to obtain data (called "response data") which it transmits back to the verifier. The verifier is also provided with the authentication function, and uses it to convert the transmitted challenge data, before comparing the result with the received response data. When these match, the verifier judges that the claimant is in possession of the valid authentication function, and so verifies the authenticity of the claimant.

The authentication function f described above is a mapping of an input group to an output group. If the input is set at X, the authentication function value will be written as $f(X)$. For this function f to be an authentication function, it is necessary for (1) f to be kept secret, and (2) such that the function value $f(X)$ may be quickly obtained from the input value X, but that the inverse calculation of the input value X from the function value $f(X)$ so difficult as to be practically impossible. In this specification, the authentication function provided in the verifier device (in a two-way authentication, the first device to perform verification) is called the "verification function", while the authentication function provided in the claimant device (in a two-way authentication, the first device to lay claim to its authenticity) is called the claimant function.

FIG. 1 is a block diagram showing the construction of a conventional device authentication system.

The system shown in FIG. 1 is composed of a production storage apparatus 10 and a production user apparatus 30 which are connected by a communication path 20. The production storage apparatus 10 is the verifier device, and is composed of a random number generation unit 11, a verification function unit 12, a comparison unit 13, a production transmission gate 14, a digital production 15, and a communication I/F unit 16. On the other hand, the production user apparatus 30 is the claimant device, and is composed of a claimant function unit 31, a production processing unit 32, and a communication I/F unit 33. Here, the verification function unit 12 and the claimant function unit 31 internally store the same authentication function f.

FIG. 2 is a representation of the communication sequence of this device authentication system.

FIG. 2 shows that the production storage apparatus 10 verifies the authenticity of production user apparatus 30, before transmitting the stored digital production 15 to the production user apparatus 30. The following is an explanation of the different processes in this sequence, using the step numbers (given in parenthesis) in FIG. 2'.

(1) The random number generation unit 11 of the production storage apparatus 10 generates the random number R and temporarily stores it, as well as transmitting it via the communication I/F unit 16 and the communication path 20 to the production user apparatus 30 as the challenge data CHA.

Here, CHA=R (2) The claimant function unit 31 receives the challenge data CHA via the communication I/F unit 33 and generates the response data RES by inputting the challenge data CHA into the claimant function that it stores internally. The claimant function unit 31 then has the response data RES transmitted via the communication path 20 to the production storage apparatus 10.

Here, RES=f(CHA)

(3) The received response data RES is inputted into the comparison unit 13 in the production storage apparatus 10. The verification function unit 12 then uses the verification function that it stores internally to calculate the reference data RR from the random number R temporarily stored in Step (1).

Here, RR=f(R)

After this, the comparison unit 13 compares the response data RES with the reference data RR.

When the comparison results in a match, the production storage apparatus 10 judges that the claimant function of the production user apparatus 30 is the same as its verification function, and so verifies the authenticity of the production user apparatus 30, before advancing to Step (4).

On the other hand, when the comparison does not result in a match, the production storage apparatus 10 regards the production user apparatus 30 as not authentic, and terminates the processing therewith.

(4) The comparison unit 13 informs the production transmission gate 14 that the comparison has resulted in a match. The production transmission gate 14 then opens a communication gate, so that the digital production 15 is transferred to the production user apparatus 30.

(5) The transferred digital production 15 is used by the production processing unit 32 in the production user apparatus 30.

In the above procedure, if a production user apparatus that does not include the valid claimant function is connected to the communication path 20 in place of the valid production user apparatus 30, this production user apparatus will not be able to generate the correct data in Step (2). As a result, this apparatus will be judged as an invalid device in Step (3). By doing so, the copyrighted digital production will not be transmitted to unauthorized devices.

It should be noted that the above example describes the case where the production storage apparatus 10 one-way authenticates the production user apparatus 30, although it is also possible for authentication to be performed in the opposite direction (so that the production user apparatus 30 authenticates the production storage apparatus 10). By doing so, complete protection of the digital production 15 can be ensured.

However, regardless of whether one-way authentication or two-way authentication is performed by the conventional device authentication system described above, there is still the problem that a great amount of effort is necessary to maintain the safety of the system when the authentication function has been decoded by an unauthorized third party, or appears to be at risk of decoding. In general, the verification function unit 12 and the claimant function unit 31 are provided in the same LSI (Large Scale Integrated circuit), so that it is necessary to withdraw all of the devices equipped with this LSI and to replace this LSI with another LSI which stores a different authentication function.

Since the relationship between the challenge data and response data is fixed in a conventional device authentication system, should an unauthorized device be used as either a transmitter or receiver, it may obtain a large number of corresponding sets of challenge data and response data and convert it into a database, creating the problem that a third party will be able to effectively possess the authentication algorithm.

SUMMARY OF THE INVENTION

The present invention has been conceived in view of the stated problems, and aims to provide a device authentication system, a device authentication method, and an appliance for achieving a device authentication system that are flexible enough to maintain the security of the authentication system without requiring the replacement of components, even when an authentication function is decoded or appears at risk of decoding. Here, it is the intention of the present invention to prevent the easy decoding of the authentication function even when an unauthorized third party gathers a large number of pairs of matching challenge data and response data, so that the high level of security of the present invention can be maintained.

The stated object can be achieved by a device authentication system, for a communication system composed of a first appliance and a second appliance that are connected by a communication path, where the first appliance verifies authenticity of the second appliance, the first appliance including: a verification function storing unit for storing a plurality of verification functions for verifying the authenticity of the second appliance; a first challenge data transmitting unit for generating first challenge data and transmitting the first challenge data to the second appliance; a first response data receiving unit for receiving first response data from the second appliance, the first response data corresponding to the first challenge data; a first verifying unit for verifying whether the first challenge data and the first response data are related by any verification function out of the plurality of verification functions; and a first authenticating unit for authenticating the second appliance when the first verifying unit finds a verification function that relates the first challenge data and the first response data, and the second appliance including: a claimant function storing unit for storing a plurality of claimant functions for proving the authenticity of the second appliance, wherein the plurality of claimant functions each correspond to a different verification function out of the plurality of verification functions; a first challenge data receiving unit for receiving the first challenge data transmitted by the first appliance; a claimant function selecting unit for selecting one claimant function out of the plurality of claimant functions; and a first response data transmitting unit for generating the first response data from the first challenge data based on the claimant function selected by the claimant function selecting unit, and transmitting the first response data to the first appliance.

With the stated construction, both the first and second appliances are provided with a plurality of authentication functions, with authentication being performed using one of these functions. As a result, even if the security of one of the authentication functions comes into doubt, the security of the system can be maintained by simply switching to another of the authentication functions, making the replacement of any of the components unnecessary. Here, it is possible to dynamically change the authentication function every time authentication is performed, so that the security of the system can be improved over that of a system which repeatedly uses the same authentication function.

Here, the first verifying unit may include a verifying function selecting unit for selecting one verification function out of the plurality of verification functions; a single function verifying unit for verifying whether the first challenge data and the first response data are related by the verification function selected by the verifying function selecting unit; a repetitive control unit for controlling the verifying function selecting unit and the single function verifying unit to select a yet unselected verification function and to perform verification when a verification performed by the single function verifying unit is unsuccessful, wherein the first authenticating unit may authenticate the second appliance when the single function verifying unit verifies that the first challenge data and the first response data are related by the selected verification function.

With the stated construction, the first appliance can determine which claimant function has been used by the second appliance to create the response data by successively using all of the verification functions, so that an unauthorized device which intercepts the communication on the communication path will not be able to specify which of the claimant functions is being used, thereby making the present device authentication system highly secure.

Here, the claimant function selecting unit may select one claimant function out of the plurality of claimant functions so as to satisfy a predetermined condition, the predetermined condition being that the first verifying unit will be able to exclusively determine only one verification function that relates the first challenge data and the first response data, out of the plurality of verification functions.

With the stated construction, the first appliance which receives the response data will be able to exclusively determine the suitable verification function, so that in the present device authentication system, one-directional authentication will definitely be completed by only one transmission of challenge data and response data.

Here, the claimant function selecting unit may include: a provisional selecting unit for provisionally selecting one claimant function out of the plurality of claimant functions: and a final selecting unit for judging whether the claimant function provisionally selected by the provisional selecting unit satisfies the predetermined condition, if so, confirming the provisionally selected claimant function as the claimant function selected by the claimant function selecting unit, and if not, searching for another claimant function that satisfies the predetermined condition and confirming the other claimant function as the claimant function selected by the claimant function selecting unit.

With the stated construction, there is a high probability that the provisionally selected claimant function will be finally selected, so that by having the provisional selecting unit provisionally select one claimant function based on an indication from outside, a flexible device authentication system that changes the authentication function used in each authentication can be achieved.

Here, the final selecting unit may include: a claimant function selection ranking storing unit for storing priority rankings for selecting one claimant function out of the plurality of claimant functions; a provisional response data generating unit for generating provisional response data from the first challenge data based on the claimant function selected by the provisional selecting unit; a suitability judging unit for judging whether there is a claimant function that generates response data from the first challenge data that is identical to the provisional response data and that has a higher priority ranking than the claimant function selected by the provisional selecting unit; and a final determining unit for finally selecting, when the suitability judging unit has found at least one claimant function that results in the same response data and has a higher priority ranking, a claimant function found by the suitability judging unit with a highest priority ranking, and for finally selecting, when the suitability judging unit has not found a claimant function that results in the same response data and has a higher priority ranking, the claimant function provisionally selected by the provisional selecting unit, wherein the first verifying unit may further include a verification function selection ranking storing unit for storing priority rankings for selecting one verification function out of the plurality of verification functions, the priority rankings corresponding to the priority rankings stored in the claimant function selection ranking storing unit, and wherein the verification function selection unit may select one verification function out of the plurality of verification functions in accordance with the priority rankings stored in the verification function selection ranking storing unit.

With the stated construction, when there are a plurality of authentication functions which produce the same function value for a given input value, the first and second appliances will be able to specify the same authentication function based on the priority rankings that they both store beforehand. Accordingly, the first appliance will definitely be able to specify the verification function corresponding to the claimant function selected by the second appliance.

Here, the second appliance may include a recording medium reading unit for reading selection information recorded on a recording medium, and the provisional selecting unit may provisionally select one claimant function in accordance with the selection information read by the recording medium reading unit.

With the stated construction, the authentication function is determined based on selection information recorded on a recording medium, so that the manufacturer of the recording medium is able to control the device authentication system.

Here, the first appliance may further comprise: an authentication notifying unit for notifying the second appliance that the first authenticating unit has authenticated the second appliance; a second challenge data receiving unit for receiving second challenge data transmitted by the second appliance; and a second response data transmitting unit for generating second transmission data from the second challenge data based on the verification function which was found by the first verifying unit to relate the first challenge data and first response data, and transmitting the generated second transmission data to the second appliance, and the second appliance may include: a second challenge data transmitting unit for generating, after being notified that the first authenticating unit has authenticated the second appliance, the second challenge data and transmitting the second challenge data to the first appliance; a second response data receiving unit for receiving the second response data transmitted by the first appliance; a second verifying unit for verifying that the second challenge data and the second response data are related by the claimant function selected by the claimant function selecting unit; and a second authenticating unit for authenticating the first appliance when the second verifying unit verifies that the second challenge data and the second response data are related by the selected claimant function.

With the stated construction, the second appliance verifies the authenticity of the first appliance in addition to the first appliance verifying the authenticity of the second appliance, so that more secure authentication can be performed.

Here, the second appliance may further comprise: a digital production reading unit for reading a digital production recorded on the recording medium; and a digital production transmitting unit for transmitting, when the second appliance has authenticated the first appliance, the digital production to the first appliance, wherein the first appliance may further comprise: a digital production receiving unit for receiving the digital production transmitted by the second appliance; and a digital production processing unit for processing the digital production to enable use of the digital production.

With the stated construction, the second appliance transfers a digital production to the first appliance when two-way authentication has been successfully performed, so that a highly secure digital production transfer system can be achieved.

Here, the plurality of verification functions and the plurality of claimant functions may be such that each verification function and corresponding claimant function is an identical one-way function; wherein the first verifying unit may perform verification by judging whether the first response data matches a result of when the first challenge data is subjected to any of the plurality of verification functions, and wherein the second verifying unit may perform verification by judging whether the second response data matches a result of when the second challenge data is subjected to any of the plurality of claimant functions.

With the stated construction, the plurality of verification functions in the first appliance and the plurality of claimant functions in the second appliance are the same set of authentication functions, so that the same components can be used for both devices.

The stated object can also be achieved by a device authentication method, for a communication system composed of a first appliance and a second appliance that are connected by a communication path, whereby the first appliance verifies authenticity of the second appliance, the first appliance having a plurality of verification functions for verifying the authenticity of the second appliance, the second appliance having a plurality of claimant functions for proving the authenticity of the second appliance, and the plurality of claimant functions each corresponding to a different verification function out of the plurality of verification functions, the device authentication method including: a challenge data transmitting step where the first appliance generates challenge data and transmits the challenge data to the second appliance; a challenge data receiving step where the second appliance receives the challenge data; a claimant function selecting step where the second appliance selects one claimant function out of the plurality of claimant functions; a response data transmitting step where the second appliance generates response data from the challenge data based on the selected claimant function, and transmits the generated response data to the first appliance; a response data receiving step where the first appliance receives the response data; a verifying step where the first appliance verifies that the challenge data and the response data are related according to at least one verification function out of the plurality of verification functions; and an authenticating step where the first appliance authenticates the second appliance when verification in the verifying step is successful.

With the stated method, when an authentication function is decoded or appears at risk of decoding, the security of a system can be maintained by simply switching to another of the authentication functions, making the replacement of any of the components unnecessary. This device authentication method prevents the easy decoding of the authentication function even when an unauthorized third party gathers a large number of pairs of matching challenge data and response data, so that a high level of security is maintained.

The stated object can also be achieved by an appliance, connected to another device by a communication path, for proving authenticity in accordance with a device authentication protocol of challenge-response type, the appliance including: a claimant function storing unit for storing a plurality of claimant functions for proving the authenticity of the appliance; a challenge data receiving unit for receiving challenge data transmitted from the other device; a claimant function selecting unit for selecting one out of the plurality of claimant functions; a response data transmitting unit for generating response data from the challenge data, based on the selected claimant function, and transmitting the response data to the other device.

With the stated construction, an appliance which serves as the claimant in a highly flexible and highly secure device authentication system can be achieved.

The stated object can also be achieved by an appliance, connected to another device by a communication path, for verifying authenticity of the other device in accordance with a device authentication protocol of challenge-response type, the appliance including: a verification function storing unit for storing a plurality of verification functions for verifying the authenticity of the other device; a challenge data transmitting unit for generating challenge data and transmitting the challenge data to the other device; a response data receiving unit for receiving response data corresponding to the challenge data from the other device; a verifying unit for verifying whether the challenge data and the response data are related by any of the plurality of verification functions; and an authenticating unit for verifying the authenticity of the other device when the verifying unit finds that the challenge data and the response data are related by at least one of the plurality of verification functions.

With the stated construction, an appliance which serves as the verifier in a highly flexible and highly secure device authentication system can be achieved.

BRIEF DESCRIPTION OF THE INVENTION

These and other objects, advantages and features of the invention will become apparent from the following description thereof taken in conjunction with the accompanying drawings which illustrate a specific embodiment of the invention. In the drawings:

FIG. 8 is a table showing the content of the claimant function priority ranking storage unit 734 (the verification function priority ranking storage unit 934) shown in FIG. 5 (FIG. 6);

FIG. 11 is a flowchart showing the details of the procedure shown as Step (4) of FIG. 9.

DESCRIPTION OF THE PREFERRED EMBODIMENT

The following is an explanation of an embodiment of the present invention, with reference to the drawings.

Figure 1:
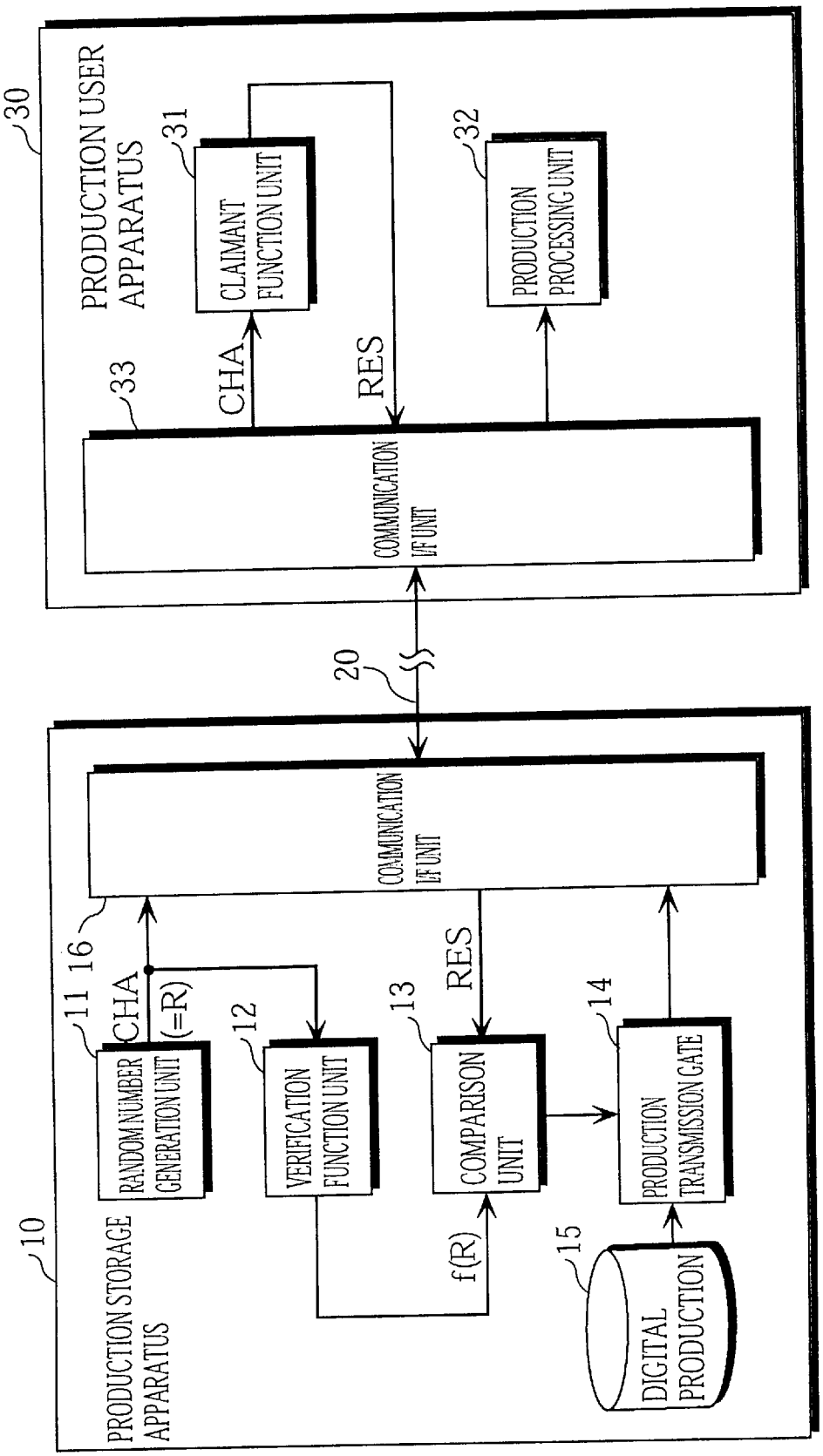
FIG. 1 is a block diagram showing the construction of a conventional device authentication system.
Figure 2:
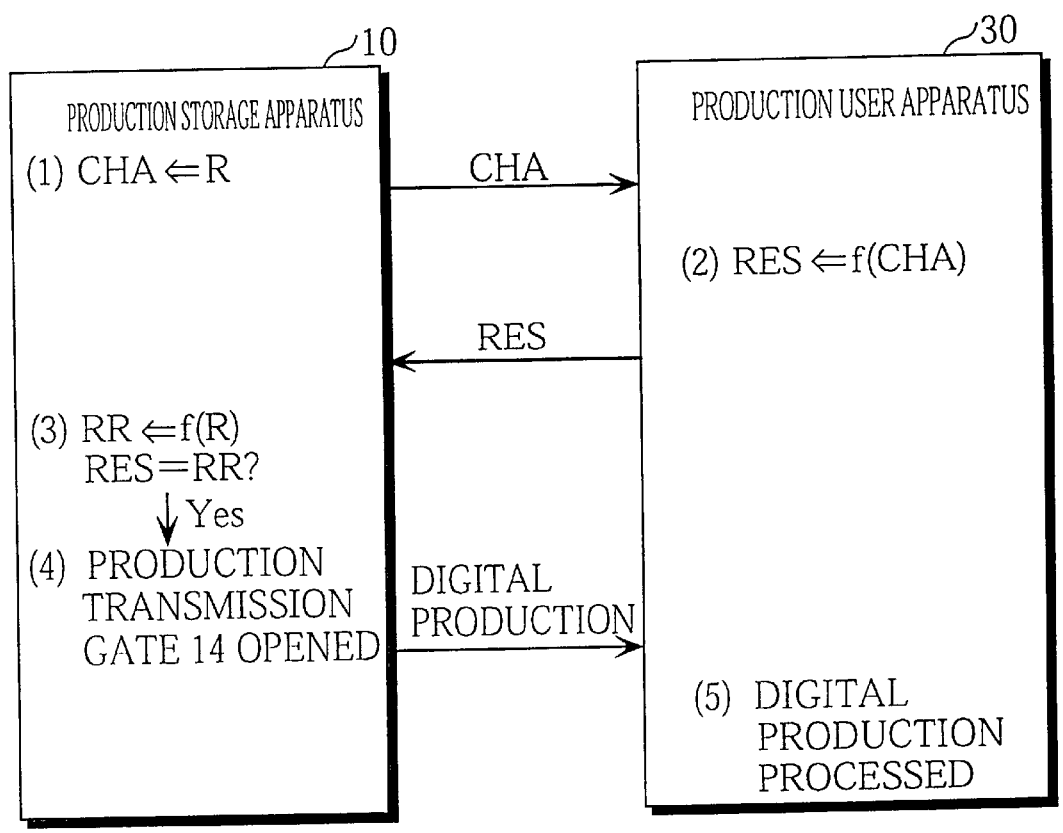
FIG. 2 shows a sequence for the operational procedure of a conventional device authentication system.
Figure 3:
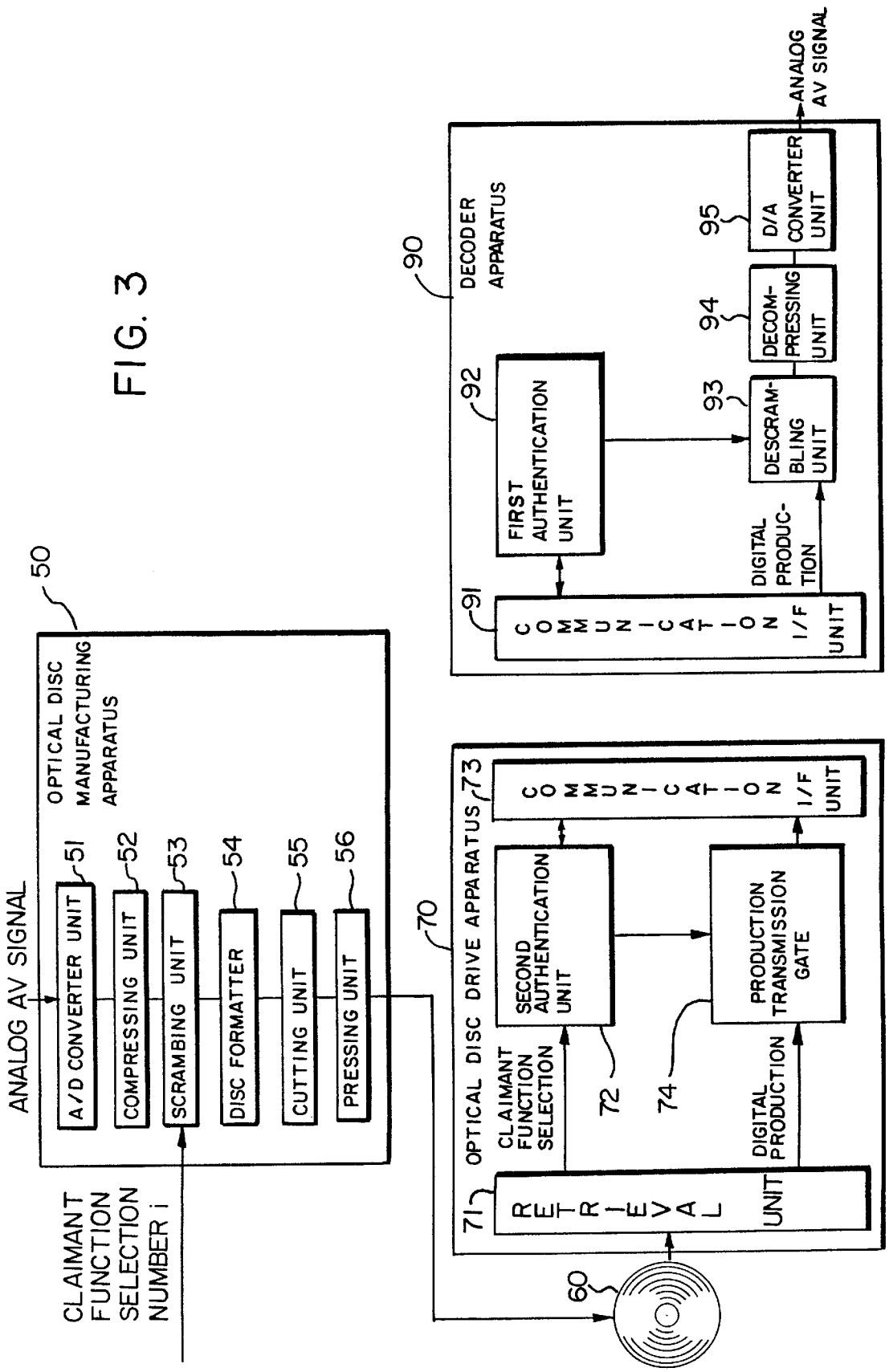
FIG. 3 is a block diagram showing the entire construction of the device authentication system of the present invention.

FIG. 3 is a block diagram showing the entire construction of the device authentication system of the present invention.

The present system is a system which guarantees that a digital production recorded on an optical disc can only be reproduced by an authenticated device. The present system is composed of an optical disc manufacturing apparatus 50, an optical disc 60, an optical disc drive apparatus 70, and a decoder apparatus 90.

The optical disc manufacturing apparatus 50 receives an input of an analog audio visual (AV) signal, representing the content of a movie or the like, and a claimant function selection number i (where i is an integer between 1 and 16) which is used for provisionally selecting the claimant function to be used when performing device authentication for the optical disc drive apparatus 70. The optical disc manufacturing apparatus 50 mass produces optical discs 60 on which the inputted information is recorded. This optical disc manufacturing apparatus 50 is composed of an A/D converter unit 51, a compressing unit 52, a scrambling unit 53, a disc formatter 54, a cutting unit 55, and a pressing unit 56.

An analog AV signal for the movie is converted into digital information by the A/D converter 51, with the resulting digital information being subjected to compression by the compressing unit 52 in accordance with MPEG2 (Moving Pictures Experts Group) standard. The scrambling unit 53 then scrambles this compressed information together with the claimant function selection number i according to a predetermined method. The cutting unit 55 then records this digitized, compressed, and scrambled production onto an optical disc which has been produced according to optical disc recording standards by the disc formatter 54, to produce a master optical disc. The pressing unit 56 then uses this master optical disc to manufacture a large number of copies 60.

On successfully executing two-way authentication with the decoder apparatus 90, the optical disc drive apparatus 70 reads the digital production recorded on the optical disc 60 and transfers it to the decoder apparatus 90. This optical disc drive apparatus 70 is composed of a retrieval unit 71, a second authentication unit 72, a communication I/F unit 73 and a production transmission gate 74.

The remote control input interpreting unit 71 is composed of an optical head and a control mechanism, and reads the claimant function selection number i and the digital production which have been recorded on the optical disc 60.

The second authentication unit 72 internally stores sixteen different claimant functions and uses one of these claimant functions both to prove the authenticity of the optical disc drive apparatus 70 in which it is installed to the decoder apparatus 90 and to verify the authenticity of the decoder apparatus 90. The second authentication unit 72 informs the production transmission gate 74 of the result (success/fail) of this verification.

The communication I/F unit 73 can be realized by a SCSI (Small Computer Systems Interface) controller and is used to perform data transmission to and from the decoder apparatus 90.

On receiving notification from the second authentication unit 72 that two-way authentication has been successful, the production transmission gate 74 sets an internal logic gate into an open positions so that the digital production sent from the retrieval unit 71 will be sent to the decoder apparatus 90 via the communication I/F unit 73.

The communication path 80 can be realized by a SCSI bus, and is the communication path used for performing two-way authentication and the transfer of the digital production between the optical disc drive apparatus 70 and the decoder apparatus 90.

The decoder apparatus 90 is an apparatus for reproducing the digital production sent from the optical disc drive apparatus 70 after completing the two-way authentication process with the optical disc drive apparatus 70. This decoder apparatus 90 is composed of a communication I/F unit 91, a first authentication unit 92, a descrambling unit 93, a decompressing unit 94, and a D/A converter unit 95.

The communication I/F unit 91 can be realized by a SCSI controller and is used to perform data transmission to and from the optical disc drive apparatus 70.

The first authentication unit 92 internally stores sixteen different verification functions and uses one of these verification functions both to prove the authenticity of the decoder apparatus 90 in which it is installed to the optical disc drive apparatus 70 and to verify the authenticity of the optical disc drive apparatus 70. The first authentication unit 92 informs the descrambling unit 93 of the result (successful/failed) of this verification.

When notification has been received from the first authentication unit 92 that two-way authentication has been successful and a digital production has been transferred from the optical disc drive apparatus 70 via the communication I/F unit 91, the descrambling unit 93 performs a descrambling of the digital production that corresponds to the scrambling performed by the scrambling unit 53.

The decompressing unit 94 decompresses (MPEG2 decoding) the digital production which has been descrambled by the descrambling unit 93. This decompressing corresponds to the compressing by the compressing unit 52.

The D/A converter unit 95 converts the digital production that has been decompressed by the decompressing unit 94 into an analog AV signal which it outputs to a CRT and speakers (not illustrated).

Figure 4:
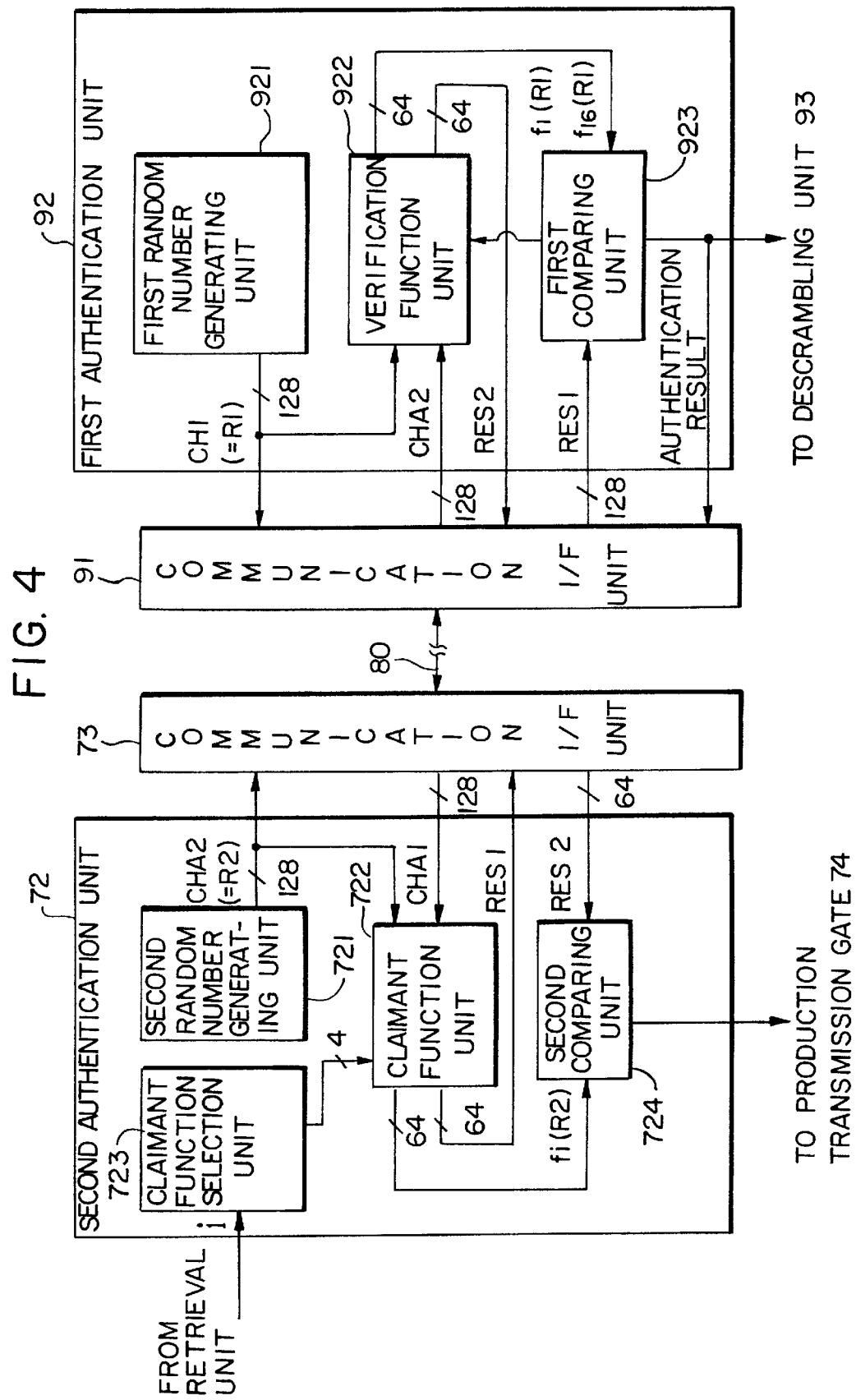
FIG. 4 is a block diagram showing the detailed construction of the second authentication unit 72 and the first authentication unit 92.

FIG. 4 is a block diagram showing the detailed construction of the second authentication unit 72 and the first authentication unit 92 shown in FIG. 3.

The second authentication unit 72 is composed of a claimant function selection unit 723, a second random number generating unit 721, a claimant function unit 722, and a second comparing unit 724.

The claimant function selection unit 723 reads the claimant function selection number i recorded on the optical disc 60 and converts the number into parallel 4-bit data that it transfers to the claimant function unit 722.

The second random number generating unit 721 generates a second random number R2 that is 128 bits long. The second random number generating unit 721 temporarily stores the second random number R2 internally, and transmits the second random number R2 to the decoder apparatus 90 via the communication I/F unit 73 and the communication path 80 as the second challenge data CHA2. When the optical disc drive apparatus 70 receives the second response data RES2, the second random number generating unit 721 transmits the temporarily stored second random number R2 to the claimant function unit 722.

The claimant function unit 722 internally stores sixteen different claimant functions and specifies one of these claimant functions based on the claimant function selection number i sent from the claimant function selection unit 723. The claimant function unit 722 then uses this specified claimant function to generate a 64-bit function value from the 128-bit input data to prove the authenticity of the optical disc drive apparatus 70 and to verify the authenticity of the decoder apparatus 90.

The second comparing unit 724 verifies the authenticity of the decoder apparatus 90 by comparing the function value fi (CHA2) for the second challenge data CHA2 sent from the claimant function unit 722 with the second response data RES2 sent from the decoder apparatus 90. The second comparing unit 724 then informs the production transmission gate 74 of the comparison result.

The first authentication unit 92 is composed of a first random number generating unit 921, a verification function unit 922, and a first comparing unit 923.

The first random number generating unit 921 generates a first random number R1 that is 128 bits long. The first random number generating unit 921 temporarily stores the second random number R1 internally, and transmits the first random number R1 to the optical disc drive apparatus 70 via the communication I/F unit 91 and the communication path 80 as the first challenge data CHA1. When the decoder apparatus 90 receives the first response data RES1, the first random number generating unit 921 transmits the temporarily stored first random number R1 to the verification function unit 922.

The verification function unit 922 internally stores sixteen different verification functions and uses one of these verification functions to generate a 64-bit function value from the 128-bit input data to prove the authenticity of the decoder apparatus 90 and to verify the authenticity of the optical disc drive apparatus 70. It should be noted here that the sixteen verification functions provided in the verification function unit 922 are the same as the sixteen claimant functions provided in the claimant function unit 722.

During the phase when the verification function unit 922 verifies the authenticity of the optical disc drive apparatus 70, the verification function unit 922 calculates sixteen function values f1(R1) to f16(R1) by inputting the first random number R1 sent from the first random number generating unit 921 into the sixteen verification functions. The verification function unit 922 then successively sends these sixteen function values f1(R1) to f16(R1) to the first comparing unit 923 as reference data. During the phase where the decoder apparatus 90 proves its authenticity, the verification function unit 922 uses the verification function specified by the verification function selection number j received from the first comparing unit 923 to generate a function value from the second challenge data CHA2 sent from the optical disc drive apparatus 70. The verification function unit 922 then sends this function value as the second response data RES2 to the optical disc drive apparatus 70.

The first comparing unit 923 is used to verify the authenticity of the optical disc drive apparatus 70. The first comparing unit 923 successively compares the first response data RES1 sent from the optical disc drive apparatus 70 with the sixteen function values f1(R1) to f16(R1) sent from the verification function unit 922 and judges that the authentication is successful when there is at least one matching function value. When there is no matching value, the first comparing unit 923 judges that the authentication has failed. The first comparing unit 923 then informs the optical disc drive apparatus 70 and the descrambling unit 93 of the verification result, and, when the verification has been successful, informs the verification function unit 922 of the number of the first matching verification function as the verification function selection number j.

Figure 5:
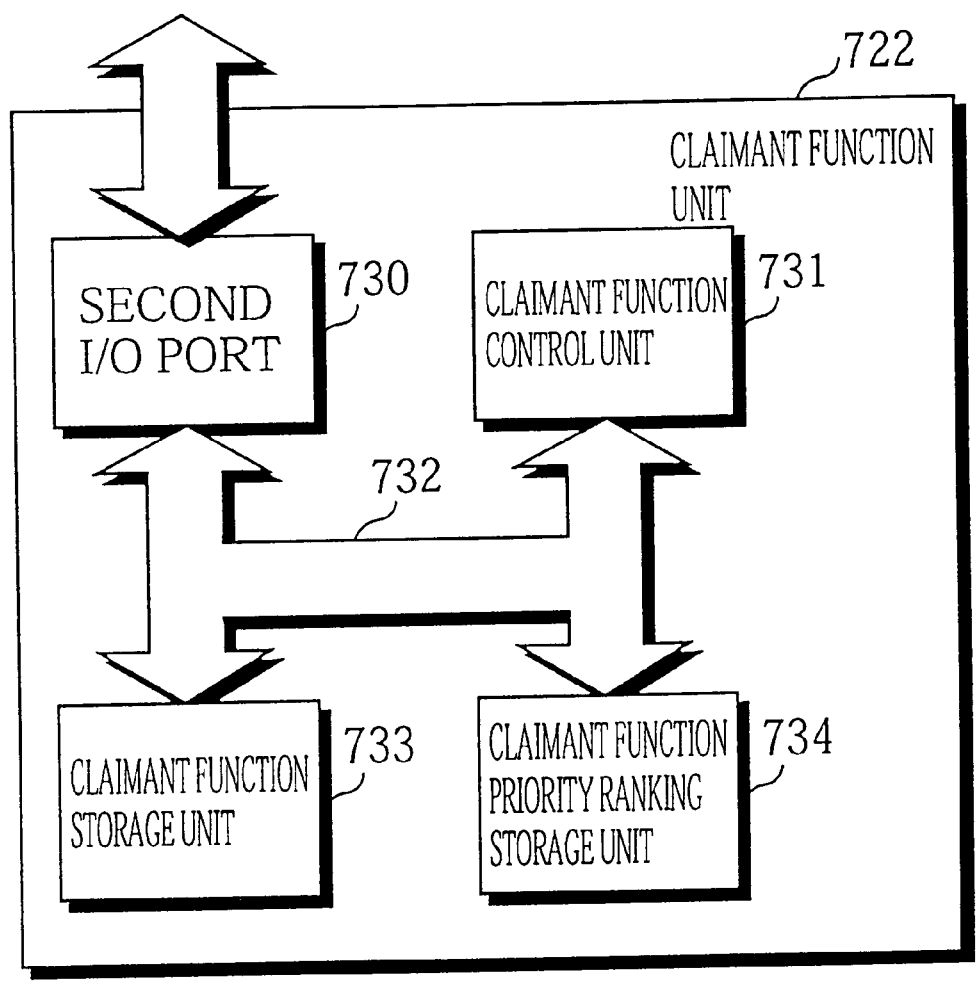
FIG. 5 is a block diagram showing the detailed construction of the claimant function unit 722 shown in FIG. 4.

FIG. 5 is a block diagram showing the detailed construction of the claimant function unit 722. The claimant function unit 722 is composed of a second I/O port 730 which is connected via a data bus 732, a claimant function control unit 731, a claimant function storage unit 733, and a claimant function priority ranking storage unit 734.

The second I/O port 730 is an input/output port for allowing the claimant function unit 722 to transmit and receive data to and from the communication I/F unit 73, the second random number generating unit 721, the claimant function selection unit 723, and the second comparing unit 724.

The claimant function storage unit 733 is an LSI for storing the sixteen claimant functions.

The claimant function priority ranking storage unit 734 stores priority rankings for making a final specification of one of the sixteen claimant functions. Here, the term "priority ranking" refers to a priority level used to specify the function to be used when a plurality of functions produce a same function value from the input data, and is set so that the smaller the value, the higher the priority.

The claimant function control unit 731 controls the second I/O port 730, the claimant function storage unit 733, and the claimant function priority ranking storage unit 734 based on an internally stored control program. As a result of this control, one claimant function for proving the authenticity of the present optical disc drive apparatus 70 is specified based on the claimant function selection number i obtained via the second I/O port 730 and the priority rankings stored in the claimant function priority ranking storage unit 734. The claimant function control unit 731 then uses the specified claimant function to generate the first response data from the first challenge data and the reference data (fi(CHA2)) from the second challenge data.

Figure 6:
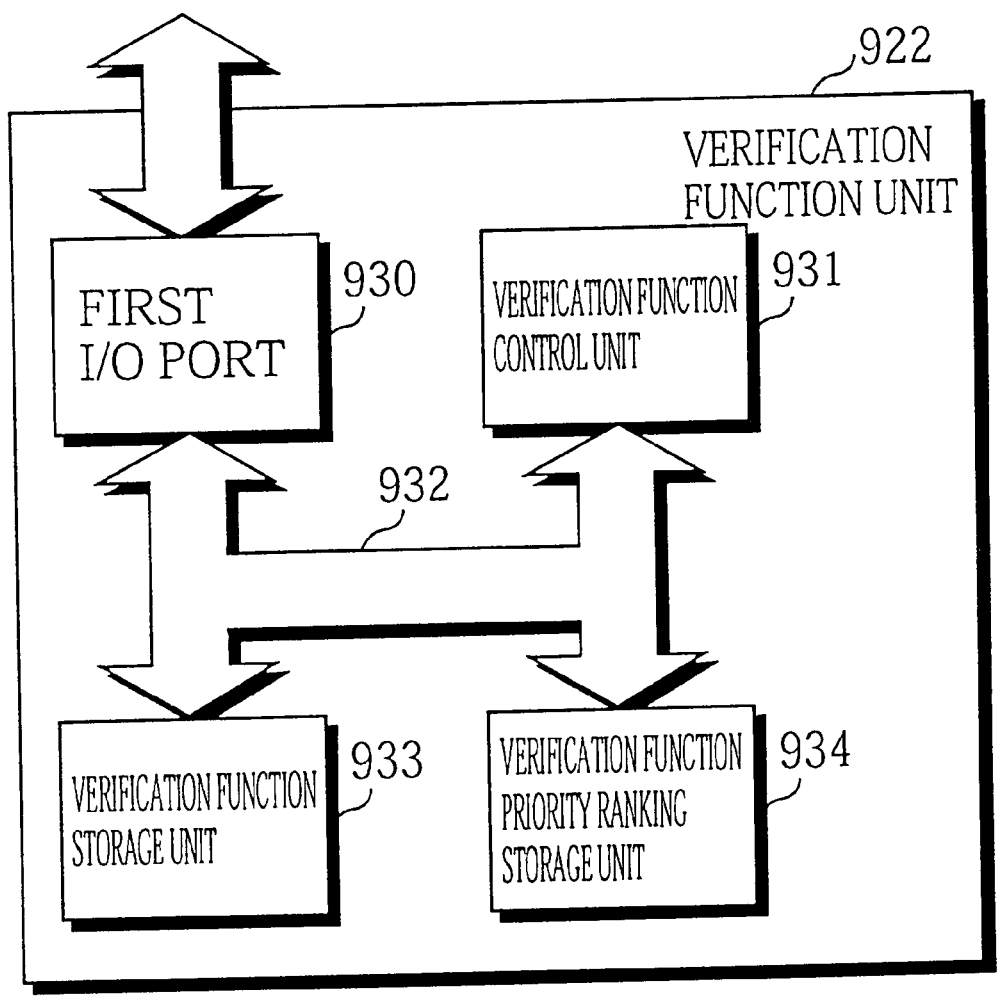
FIG. 6 is a block diagram showing the detailed construction of the verification function unit 922 shown in FIG. 4.

FIG. 6 is a block diagram showing the detailed construction of the verification function unit 922. This verification function unit 922 is composed of a first I/O port 930 which is connected via a data bus 932, a verification function control unit 931, a verification function storage unit 933, and a verification function priority ranking storage unit 934.

The first I/O port 930 is an input/output port for allowing the verification function unit 922 to transmit and receive data to and from the communication I/F unit 91, the first random number generating unit 921, and the first comparing unit 923.

The verification function storage unit 933 and verification function priority ranking storage unit 934 are equipped with the same functions as the claimant function storage unit 733 and the claimant function priority ranking storage unit 734 described above.

The verification function control unit 931 controls the first I/O port 930, the verification function storage unit 933, and the verification function priority ranking storage unit 934 based on an internally stored control program. The verification function control unit 931 successively calculates the sixteen function values f1(R1) to f16(R1) in accordance with the priority rankings stored in the verification function priority ranking storage unit 934, and uses the verification function specified by the verification function selection number j sent from the first comparing unit 923 to calculate the second response data RES2.

Figure 7:
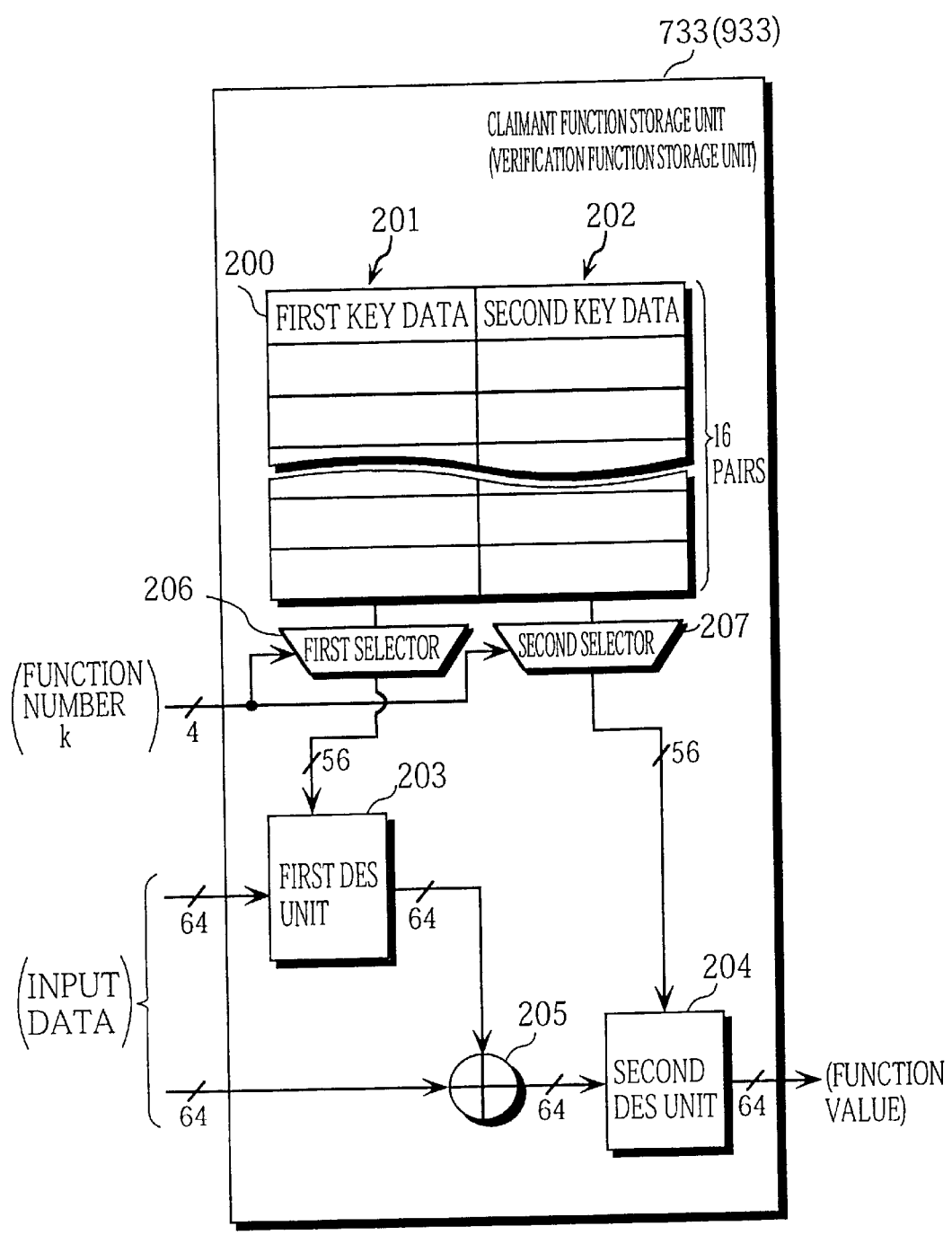
FIG. 7 is a block diagram showing the detailed construction of the claimant function storage unit 733 (the verification function storage unit 933) shown in FIG. 5 (FIG. 6)

FIG. 7 is a block diagram showing the detailed construction of the claimant function storage unit 733 and the verification function storage unit 933 which are shown in FIG. 5 and in FIG. 6.

The claimant function storage unit 733 and the verification function storage unit 933 are each composed of a key data storage unit 200, a first DES unit 203, a second DES unit 204, a logical XOR unit 205, a first selector 206, and a second selector 207.

The key data storage unit 200 stores sixteen pairs of confidential first key data that is 56 bits long and confidential second key data that is also 56 bits long. The first selector 206 and the second selector 207 respectively select a set of first key data and a set of second key data that are specified by the 4-bit function number k which is inputted via the data bus 732, and send the specified key data to the first DES unit 203 and second DES unit 204. The first DES unit 203 and the second DES unit 204 encrypt plaintext data that is 64 bits long using the 56-bit sets of key data inputted from the first selector 206 and the second selector 207, in accordance with a data encryption standard (DES). The resulting sets of 64-bit data are inputted into the logical XOR unit 205 and a logical XOR operation is performed. Here, the first DES unit 203, the second DES unit 204, and the logical XOR unit 205 form a one-way function encryption module that generates 64-bit cryptogram data from 128-bit plaintext data based on 112-bit key data.

FIG. 8 is a table showing the content of the claimant function priority ranking storage unit 734 and verification function priority ranking storage unit 934 shown in FIGS. 5 and 6. The numbers in the left column of this table are the values of the function number k that identify the sixteen claimant (or verification) functions stored in the claimant function storage unit 733 and the verification function storage unit 933, with these values of the function number k corresponding to the locations in the key data storage unit 200 of FIG. 7 where the first key data and second key data are stored. The numbers in the right column are the priority rankings of the functions indicated in the left column.

The following is an explanation of the operation of the present device authentication system constructed as described above.

Figure 9:
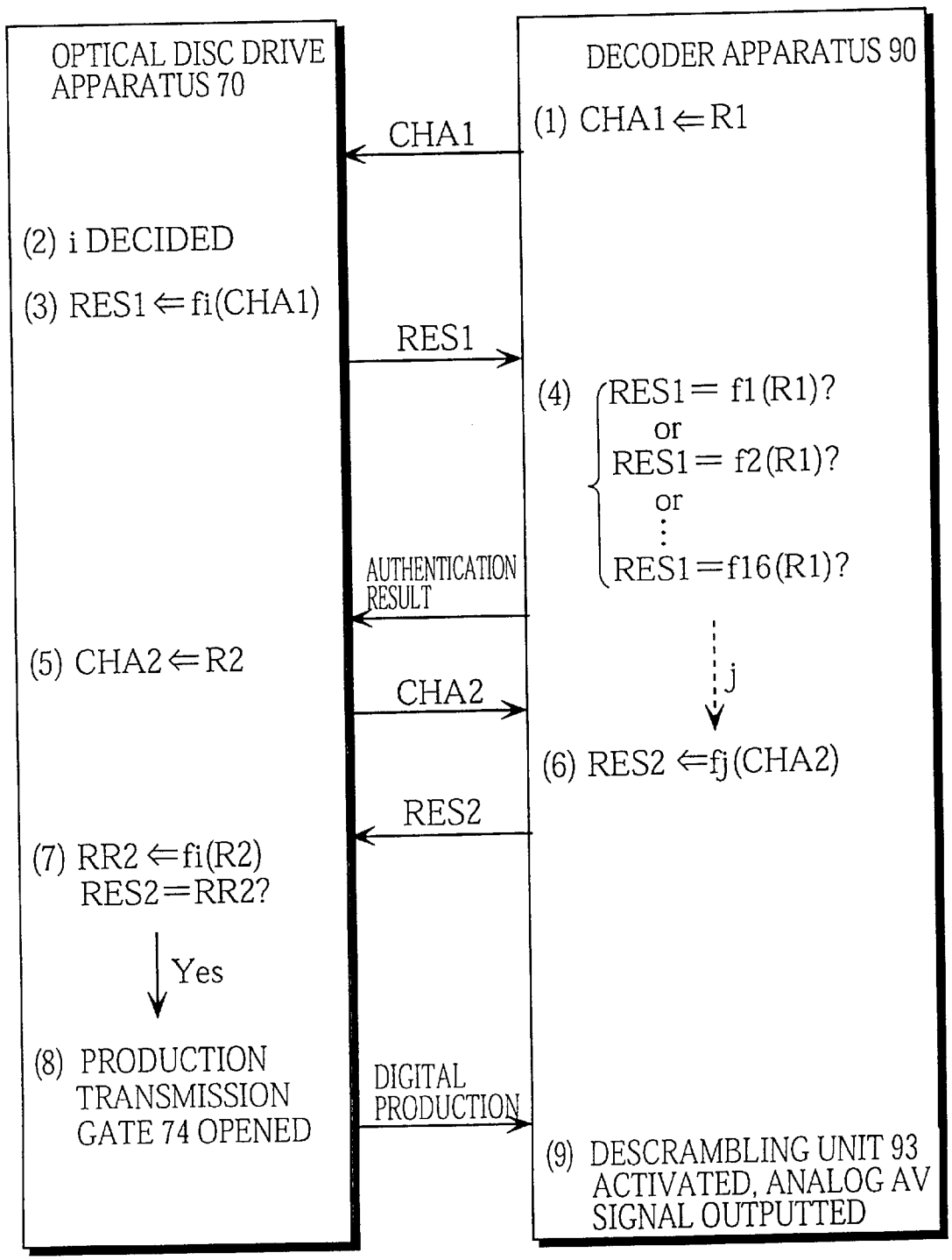
FIG. 9 shows a sequence for the entire operation of the present device authentication system.

FIG. 9 shows a sequence drawing for the operation of the device authentication system as a whole. The numbers given in parentheses in this figure are step numbers.

Figure 10:
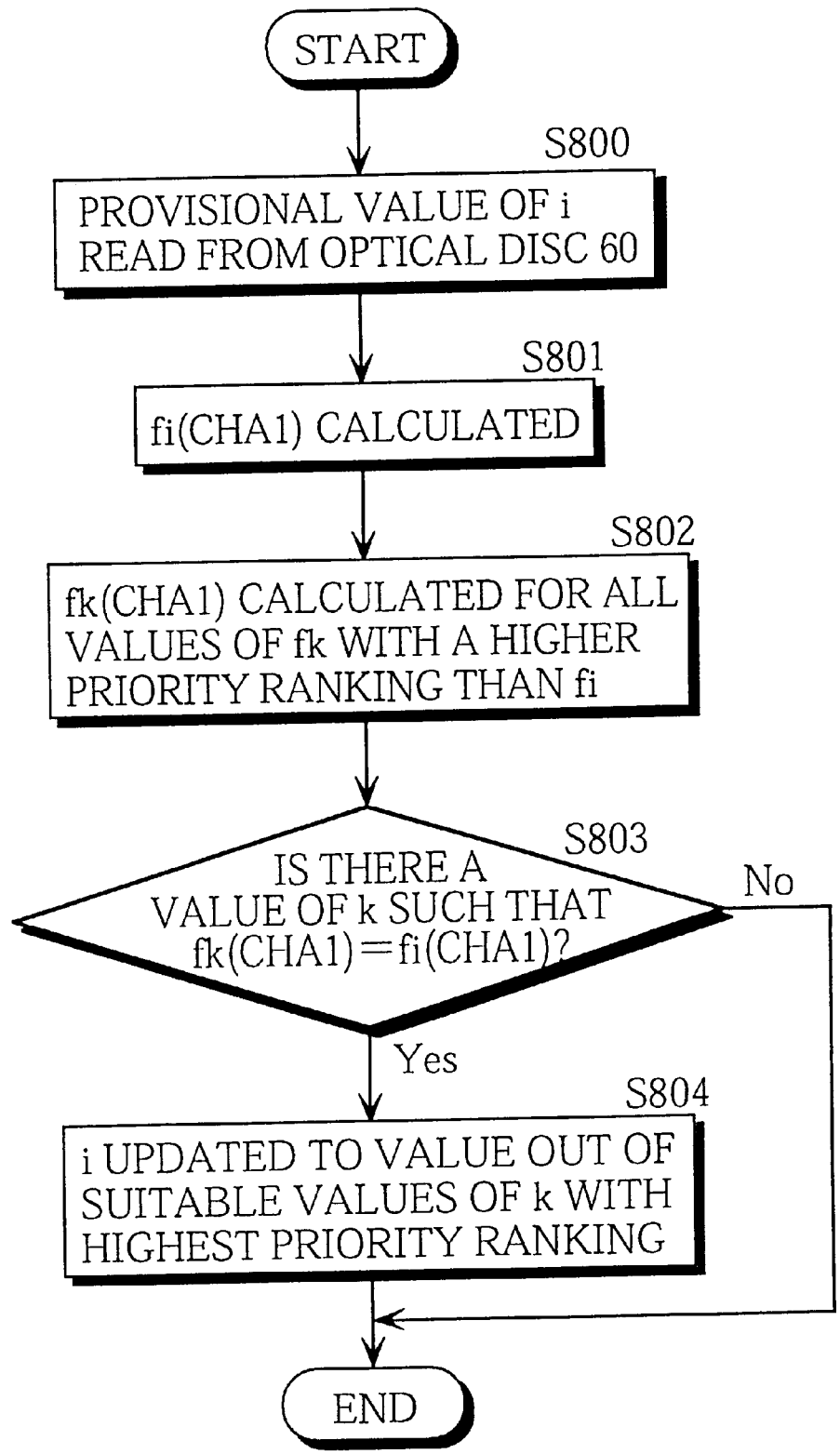
FIG. 10 is a flowchart showing the details of the procedure shown as Step (2) of FIG. 9.

FIG. 10 is a flowchart showing the detailed processing in Step (2) of FIG. 9.

FIG. 11 is a flowchart showing the detailed processing in Step (4) of FIG. 9.

The sequence shown in FIG. 9 can be roughly divided into three phases which are a first phase (Steps (1) to (4)) in which the decoder apparatus 90 verifies the authenticity of the optical disc drive apparatus 70, a second phase (Steps (5) to (7)) in which the optical disc drive apparatus 70 verifies the authenticity of the decoder apparatus 90, and a third phase (Steps (8) and (9)) in which the optical disc drive apparatus 70 transfers the digital production to the decoder apparatus 90. Here, the protocol of the first and second phase corresponds to the two-way authentication of the apparatuses.

First Phase

In the first phase, the decoder apparatus 90 verifies that the present optical disc drive apparatus 70 is an authenticated optical disc drive apparatus, before receiving a digital production such as a movie and performing reproduction.

Step (1)

The first random number generating unit 921 of the decoder apparatus 90 generates the random number R1, temporarily stores it, and transmits it via the communication I/F unit 91 and the communication path 80 to the optical disc drive apparatus 70 as the first challenge data CHA1.

CHA1=R1

Step (2)

The optical disc drive apparatus 70 selects one of the claimant functions to be used for the two-way authentication, out of the sixteen claimant functions provided in the claimant function unit 722. In more detail, the claimant function selection unit 723 has the claimant function selection number i read from the optical disc 60 by the retrieval unit 71 and informs the claimant function unit 722 of the read claimant function selection number i (S800).

The claimant function control unit 731 of the claimant function unit 722 receives the first challenge data CHA1 transmitted in Step (1) and inputs this into the claimant function fi() specified by the claimant function selection number i to calculate the function value fi(CHA1) (S801).

The claimant function control unit 731 then refers to the claimant function priority ranking storage unit 734 and judges whether there is a claimant function fk() whose priority ranking is higher than the claimant function selection number i and whose function value fk(CHA1) for the first challenge data CHA1 is the same as the function value fi(CHA1) (S802–S803).

When, as a result, there is one or more functions which satisfies the above condition, the claimant function control unit 731 sets the claimant function selection number i so that the claimant function fk() which the highest priority ranking out of these functions is used as the claimant function (S804). When there are no functions which satisfy the above condition, the claimant function control unit 731 uses the claimant function selection number i obtained in S800 to specify the claimant function fi(). This final claimant function selection number i is stored by the verification function control unit 731.

Step (3)

The claimant function unit 722 uses the claimant function fi() specified by the claimant function selection number i determined in Step (2) to calculate the first response data RES1 from the first challenge data CHA1, and sends this to the decoder apparatus 90.

RES1=fi(CHA1)

Step (4)

Having received the first response data RES1, the decoder apparatus 90 verifies that this first response data RES1 is related to at least one of the results of when the first random number R1 temporarily stored in Step (1) is subjected to each of its sixteen verification functions.

When verification is affirmative, the decoder apparatus 90 informs the optical disc drive apparatus 70 that its authenticity has been verified and stores the number (verification function selection number j) of the verification function fj() for which the verification was affirmative. On the other hand, when the verification is negative, the decoder apparatus 90 rejects the optical disc drive apparatus 70 as non-authentic and terminates the processing.

In more detail, when the decoder apparatus 90 has received the first response data RES1, the verification function unit 922 successively calculates the function values f1(R1)–f16(R1) by inputting the first random number R1 temporarily stored in Step (1) into each of the sixteen verification functions stored in the verification function storage unit 933. The verification function unit 922 then sends the calculated results in accordance with the priority rankings stored in the verification function priority ranking storage unit 934 to the first comparing unit 923 (S810).

The first comparing unit 923 compares the first response data RES1 transmitted in Step (3) with the sixteen function values f1(R1)–f16(R1) sent from the verification function unit 922 (S811).

When there is a match, the first comparing unit 923 informs the verification function unit 922 of the function number (verification function selection number j) of the matching function value fj(R1) which was received first, which is to say, the matching function value fj(R1) with the highest priority ranking. The first comparing unit 923 then informs the optical disc drive apparatus 70 and the descrambling unit 93 that the authenticity of the optical disc drive apparatus 70 has been verified (S812–S813).

On the other hand, when there is no matching value, the first comparing unit 923 informs the optical disc drive apparatus 70 and the descrambling unit 93 that the verification of the authenticity of the optical disc drive apparatus 70 has not been successful and so does not perform the rest of the authentication protocol (S814).

Second Phase

When the authentication in the first phase has been successful, the second phase is performed as the part of the authentication protocol for the opposite direction. In this second phase, the optical disc drive apparatus 70 verifies that the decoder apparatus 90 connected via the communication path 80 is an authenticated decoder apparatus.
Step (5)

On receiving notification from the decoder apparatus 90 showing that it has been verified, the optical disc drive apparatus 70 has the second random number generating unit 721 generate a second random number R2, temporarily stores it, and transmits it to the decoder apparatus 90 as the second challenge data CHA2.

CHA2=R2

Step (6)

On receiving the second challenge data CHA2, the verification function unit 922 calculates the second response data RES2 from the second challenge data CHA2, using the verification function fj() specified by the verification function selection number j indicated by the first comparing unit 923 in Step (4). The verification function unit 922 then transmits this second response data RES2 to the optical disc drive apparatus 70.

Step (7)

The transmitted second response data RES2 is inputted into the second comparing unit 724 of the optical disc drive apparatus 70. The claimant function unit 722 calculates the reference data RR2 from the second random number R2 which was temporarily stored in Step (5), using the claimant function fi() specified using the claimant function selection number i determined in Step (2).

RR2=fi(R2)

The second comparing unit 724 then compares the second response data RES2 with the reference data RR2.

When the comparison results in a match, the second comparing unit 724 regards the claimant function fi() as the same as the verification function fj() used by the decoder apparatus 90, and so sends notification of the authentication of decoder apparatus 90, which is to say a notification that two-way authentication has been successful, to the production transmission gate 74.

On the other hand, when the comparison does not result in a match, the second comparing unit 724 informs the production transmission gate 74 that authentication has failed, so that the remainder of the authentication protocol is canceled.

Third Phase

When the authentication in the second phase is successful, the two-way authentication process is complete and the processing advances to the third phase where the digital production is transmitted.
Step (8)

On receiving notification that two-way authentication has been successful, the production transmission gate 74 places its internal logic gate into the open position. By doing so, the digital production which is recorded on the optical disc 60 is transferred to the decoder apparatus 90 via the retrieval unit 71, the production transmission gate 74, the communication I/F unit 73, and the communication path 80.
Step (9)

The transferred digital production is inputted into the descrambling unit 93 via the communication I/F unit 91 of the decoder apparatus 90. If the descrambling unit 93 received notification of successful authentication from the first authentication unit 92 in Step (4), the descrambling unit 93 descrambles the digital production sent from the optical disc drive apparatus 70 and outputs the result to the decompressing unit 94 which then decompresses the data. After this, the digital production which has been restored to an unscrambled and uncompressed state is converted into an analog AV signal by the D/A converter unit 95 and is outputted to a CRT and speakers (not illustrated) where it is reproduced.

As described above, devices which are provided with a plurality of authentication functions can perform two-way authentication using the present device authentication system.

When a non-authenticated device which does not possess the correct claimant function is connected to the communication path 80 in place of the authenticated optical disc drive apparatus 70, this non-authenticated device will not be able to generate the correct first response data RES1 in Step (3). As a result, in Step (4), the decoder apparatus 90 will not have a verification function to relate the first random number R1 to the first response data RES1, so that the decoder apparatus 90 will judge that the connected device is not authenticated.

In the same way, when a non-authenticated device which does not possess the correct verification function is connected to the communication path 80 in place of the authenticated decoder apparatus 90, this non-authenticated device will not be able to transmit the correct second response data RES2 in Step (6). As a result, in Step (7), the optical disc drive apparatus 70 will find that the second response data RES2 does not match the reference data RR2, and so will judge that the connected device is not authenticated.

Unlike conventional systems which only include one pair of functions, the present device authentication system selects one pair of a claimant function and verification function for use in authentication, out of the sixteen pairs of claimant functions and verification functions which are provided in each device. Accordingly, while there is the risk when a same pair of functions is repeatedly used that a non-authorized device will be able to decode the functions, the present system can always switch to using a different pair of functions, so that the security of the present system can be maintained without having to replace any of its components.

The present system is also such that no information (claimant function selection number i) regarding which of the sixteen claimant functions has been selected by the claimant is transmitted to the verifier. Accordingly, it is possible to avoid the situation where this information is directly intercepted by a non-authenticated device.

In the present device authentication system, both the claimant and the verifier have the priority rankings set for the sixteen authentication functions, so that these can be used when specifying one out of the sixteen authentication functions. As a result, even though the claimant gives the verifier no information (claimant function selection number i) regarding which of the sixteen claimant functions has been selected, both devices will be able to exclusively specify the same authentication function once one-way authentication has been completed.

With the present device authentication system, authentication performed using one of the authentication functions is achieved by having the claimant function selection number i recorded on the optical disc 60. By doing so, a third party who is not directly concerned with the device authentication system (which is to say, a disc manufacturer) is able to choose which authentication function is to be used, meaning that the device authentication system is flexible enough to allow external control to be performed.

The device authentication system of the present invention has been described using the embodiment given above, although it should be obvious that the technical scope of the present invention is not limited to this embodiment. Several possible modifications are described below.

(1) The above embodiment describes the case where the present system is used for two-way authentication, although it is also possible for the present invention to be adapted to one-way authentication. Here, such system uses the characteristics of the present invention whereby both the claimant and the verifier are provided with the same plurality of authentication functions and the authentication function used in each execution of the authentication protocol can change.

It should be noted that when one-way authentication is performed in place of two-way authentication, the claimant function priority ranking storage unit 734 of the optical disc drive apparatus 70 and the verification function priority ranking storage unit 934 of the decoder apparatus 90 are no longer necessary. In such a case, the verifier merely needs to verify that the first response data transmitted from the claimant matches at least one of the sixteen sets of reference data, and it is no longer necessary to make a definite specification of the claimant function used by the claimant.

(2) In the present embodiment, the corresponding claimant functions and verification functions were described as being the same functions, although this does not need to be the case with the present invention, so that the claimant functions and verification functions may express an inverse mapping relationship with one another (such as encoding and decoding). In such a case, in Step (4) of FIG. 9, the decoder apparatus 90 may verify the authenticity of the optical disc drive apparatus 70 by seeing if any of the values of f1(RES1) to f16(RES1) obtained by inputting the received response data RES1 into the sixteen claimant functions match the first random number R1.

It is also possible to use a technique based on public key encryption and give the claimant function and verification functions different characteristics.

(3) In the present embodiment, the production user apparatus (decoder apparatus 90) was described as verifying the production storage apparatus (optical disc drive apparatus 70) first, with the inverse operation then being performed. This authentication may, however, be performed in reverse order.

In such a case, the production storage apparatus transmits challenge data to the production user apparatus, with the production user apparatus selecting one out of sixteen claimant functions and generating response data. On receiving the response data, the production storage apparatus verifies the authenticity of the production user apparatus. When authentication is successful, the processing then proceeds to the authentication by the production user apparatus of the production storage apparatus.

(4) It is also possible to conceive methods for executing two-way authentication that do not require the claimant function priority ranking storage unit 734 of the optical disc drive apparatus 70 of the present embodiment or the verification function priority ranking storage unit 934 of the decoder apparatus 90 of the present embodiment. These methods are described below.

(i) The sixteen authentication functions are set as f1() to f16(), with each of these functions having a characteristic that "for all potential input values R, the sixteen function values f1(R) to f16(R) will all be different. However, the use of sixteen functions which exhibit this characteristic is simplistic and leads to the system having a low degree of security.

(ii) When a matching value is found out of the sixteen claimant function values obtained from the received challenge data, the claimant may ask the verifier to issue different challenge data, with the authentication process then being repeated. However, in such a case there is no guarantee that the authentication process will converge.

(5) In the present embodiment, the device authentication system was described as a system for reproducing digital productions that are AV related, although the present system may be adapted for use as a system for transferring digitized documents, audio, images, or programs in a way which prevents illegal copying.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A device authentication system, for a communication system composed of a first appliance and a second appliance that are connected by a communication path, where the first appliance verifies authenticity of the second appliance, the first appliance comprising:
   verification function storing means for storing a plurality of verification functions for verifying the authenticity of the second appliance;
   first challenge data transmitting means for generating first challenge data and transmitting the first challenge data to the second appliance;
   first response data receiving means for receiving first response data from the second appliance, the first response data corresponding to the first challenge data;
   first verifying means for verifying whether the first challenge data and the first response data are related by a verification function out of the plurality of verification functions; and
   first authenticating means for authenticating the second appliance when the first verifying means finds the verification function that relates the first challenge data and the first response data, and the second appliance comprising:

claimant function storing means for storing a plurality of claimant functions for proving the authenticity of the second appliance, wherein the plurality of claimant functions each correspond to a different verification function out of the plurality of verification functions;

first challenge data receiving means for receiving the first challenge data transmitted by the first appliance;

claimant function selecting means for selecting one claimant function out of the plurality of claimant functions; and first response data transmitting means for generating the first response data from the first challenge data based on the claimant function selected by the claimant function selecting means, and transmitting the first response data to the first appliance.

2. The device authentication system of claim 1, wherein the first verifying means includes:

a verifying function selecting unit for selecting one verification function out of the plurality of verification functions;

a single function verifying unit for verifying whether the first challenge data and the first response data are related by the verification function selected by the verifying function selecting unit;

a repetitive control unit for controlling the verifying function selecting unit and the single function verifying unit to select a yet unselected verification function and to perform verification when a verification performed by the single function verifying unit is unsuccessful, wherein the first authenticating means authenticates the second appliance when the single function verifying unit verifies that the first challenge data and the first response data are related by the selected verification function.

3. The device authentication system of claim 2, wherein the claimant function selecting means selects one claimant function out of the plurality of claimant functions so as to satisfy a predetermined condition, the predetermined condition being that the first verifying means will be able to exclusively determine only one verification function that relates the first challenge data and the first response data, out of the plurality of verification functions.

4. The device authentication system of claim 3, wherein the claimant function selecting means includes:

a provisional selecting unit for provisionally selecting one claimant function out of the plurality of claimant functions: and a final selecting unit for judging whether the claimant function provisionally selected by the provisional selecting unit satisfies the predetermined condition, if so, confirming the provisionally selected claimant function as the claimant function selected by the claimant function selecting means, and if not, searching for another claimant function that satisfies the predetermined condition and confirming the other claimant function as the claimant function selected by the claimant function selecting means.

5. The device authentication system of claim 4, wherein the final selecting unit includes:

a claimant function selection ranking storing unit for storing priority rankings for selecting one claimant function out of the plurality of claimant functions;

a provisional response data generating unit for generating provisional response data from the first challenge data based on the claimant function selected by the provisional selecting unit;

a suitability judging unit for judging whether there is a claimant function that generates response data from the first challenge data that is identical to the provisional response data and that has a higher priority ranking than the claimant function selected by the provisional selecting unit; and a final determining unit for finally selecting, when the suitability judging unit has found at least one claimant function that results in the same response data and has a higher priority ranking, a claimant function found by the suitability judging unit with a highest priority ranking, and for finally selecting, when the suitability judging unit has not found a claimant function that results in the same response data and has a higher priority ranking, the claimant function provisionally selected by the provisional selecting unit, wherein the first verifying means further includes a verification function selection ranking storing unit for storing priority rankings for selecting one verification function out of the plurality of verification functions, the priority rankings corresponding to the priority rankings stored in the claimant function selection ranking storing unit, and wherein the verification function selection unit selects one verification function out of the plurality of verification functions in accordance with the priority rankings stored in the verification function selection ranking storing unit.

6. The device authentication system of claim 5, wherein the second appliance includes a recording medium reading means for reading selection information recorded on a recording medium, and wherein the provisional selecting unit provisionally selects one claimant function in accordance with the selection information read by the recording medium reading means.

7. The device authentication system of claim 6, wherein the first appliance further comprises:

authentication notifying means for notifying the second appliance that the first authenticating means has authenticated the second appliance;

second challenge data receiving means for receiving second challenge data transmitted by the second appliance; and second response data transmitting means for generating second transmission data from the second challenge data based on the verification function which was found by the first verifying means to relate the first challenge data and first response data, and transmitting the generated second transmission data to the second appliance, and wherein the second appliance includes:

second challenge data transmitting means for generating, after being notified that the first authenticating means has authenticated the second appliance, the second challenge data and transmitting the second challenge data to the first appliance;

second response data receiving means for receiving the second response data transmitted by the first appliance;

second verifying means for verifying that the second challenge data and the second response data are related by the claimant function selected by the claimant function selecting means; and second authenticating means for authenticating the first appliance when the second verifying means verifies that the second challenge data and the second response data are related by the selected claimant function.

8. The device authentication system of claim 7, wherein the second appliance further comprises:

digital production reading means for reading a digital production recorded on the recording medium; and digital production transmitting means for transmitting, when the second appliance has authenticated the first appliance, the digital production to the first appliance, wherein the first appliance further comprises:

digital production receiving means for receiving the digital production transmitted by the second appliance; and digital production processing means for processing the digital production to enable use of the digital production.

9. The device authentication system of claim 8, wherein the digital production recorded on the recording medium is encrypted, and wherein the digital production processing means decrypts the encrypted digital production.

10. The device authentication system of claim 9, wherein the plurality of verification functions and the plurality of claimant functions are such that each verification function and corresponding claimant function is an identical one-way function;

wherein the first verifying means performs verification by judging whether the first response data matches a result of when the first challenge data is subjected to any of the plurality of verification functions, and wherein the second verifying means performs verification by judging whether the second response data matches a result of when the second challenge data is subjected to any of the plurality of claimant functions.

11. A device authentication method, for a communication system composed of a first appliance and a second appliance that are connected by a communication path, whereby the first appliance verifies authenticity of the second appliance, the first appliance having a plurality of verification functions for verifying the authenticity of the second appliance, the second appliance having a plurality of claimant functions for proving the authenticity of the second appliance, and the plurality of claimant functions each corresponding to a different verification function out of the plurality of verification functions, the device authentication method comprising:

a challenge data transmitting step where the first appliance generates challenge data and transmits the challenge data to the second appliance;

a challenge data receiving step where the second appliance receives the challenge data;

a claimant function selecting step where the second appliance selects one claimant function out of the plurality of claimant functions;

a response data transmitting step where the second appliance generates response data from the challenge data based on the selected claimant function, and transmits the generated response data to the first appliance;

a response data receiving step where the first appliance receives the response data;

a verifying step where the first appliance verifies that the challenge data and the response data are related according to at least one verification function out of the plurality of verification functions; and an authenticating step where the first appliance authenticates the second appliance when verification in the verifying step is successful.

12. The device authentication method of claim 11, wherein in the claimant function selecting step the second appliance provisionally selects a provisional claimant function out of the plurality of claimant functions, calculates a provisional function value from the challenge data based on the provisional claimant function, judges whether a function value equal to the provisional function value is calculated from the challenge data by any other claimant function, and, when there is at least one other function with a matching function value, finally selects one claimant function with a function value equal to the provisional function value as a finally selected claimant function and, when these is no other function with a matching function value, finally selects the provision claimant function as the finally selected claimant function.

13. The device authentication method of claim 12, wherein in the claimant function selecting step, the second appliance obtains an indication inputted from outside and selects the provisional claimant function out of the plurality of claimant functions based on the inputted indication.

14. An appliance, connected to another device by a communication path, for proving authenticity in accordance with a device authentication protocol of challenge-response type, the appliance comprising:

claimant function storing means for storing a plurality of claimant functions for proving the authenticity of the appliance;

challenge data receiving means for receiving challenge data transmitted from the other device;

claimant function selecting means for selecting one out of the plurality of claimant functions;

response data transmitting means for generating response data from the challenge data, based on the selected claimant function, and transmitting the response data to the other device.

15. The appliance of claim 14, wherein the claimant function selecting means provisionally selects one claimant function out of the plurality of claimant functions, calculates a provisional function value from the challenge data based on the provisionally selected claimant function, judges whether a function value equal to the provisional function value is calculated from the challenge data by any other claimant function, and, when there is at least one other function with a matching function value, finally selects one claimant function with a function value equal to the provisional function value as a finally selected claimant function and, when these is no other function with a matching function value, finally selects the provision claimant function as the finally selected claimant function.

16. The appliance of claim 15, wherein the claimant function selecting means obtains an indication inputted from outside and provisionally selects one claimant function out of the plurality of claimant functions in accordance with the inputted indication.

17. An appliance, connected to another device by a communication path, for verifying authenticity of the other device in accordance with a device authentication protocol of challenge-response type, the appliance comprising:

verification function storing means for storing a plurality of verification functions for verifying the authenticity of the other device;

challenge data transmitting means for generating challenge data and transmitting the challenge data to the other device;

response data receiving means for receiving response data corresponding to the challenge data from the other device;

verifying means for verifying whether the challenge data and the response data are related by any of the plurality of verification functions; and authenticating means for verifying the authenticity of the other device when the verifying means finds that the challenge data and the response data are related by at least one of the plurality of verification functions.

18. The appliance of claim 17, further comprising:

a verification function selection ranking storing unit for storing predetermined priority rankings for selecting one verification function out of the plurality of verification functions; and verification function specifying means for specifying, when the verifying means finds that the challenge data and the response data are related by at least one of the plurality of verification functions, one of the verification functions that relates the challenge data and the response data, based on the priority rankings.

19. A device authentication system for a communication system between a first appliance and a second appliance connectable by a communication path, comprising:

the first appliance comprising:

a first verification storing means for storing a predetermined plurality of verification functions, each verification function being different from another one;

a first challenge data transmitting means for generating a variable first challenge data that can be operated upon by anyone of the verification functions, and transmitting the first challenge data to the second appliance; and a first comparing unit for receiving a first response data, from the second appliance, in response to the sending of the first challenge data to the second appliance that is related to the first challenge data and comparing the first response data with a plurality of operands of operations between the plurality of verification functions and the first challenge data whereby if one of the stored verification functions is found a first authentication signal is generated, and the second appliance comprising:

a second verification storing means for storing the predetermined plurality of verification functions;

a first challenge data receiving means for receiving the first challenge data;

a first function selecting means for selecting one of the predetermined plurality of verification functions stored in the second verification storing means; and a first response data transmitting means for generating the first response data from the selected verification function and the first challenge data and transmitting the first response data to the first appliance.

20. The device authentication system of claim 19, further including a medium for storing proprietary data and a selection value, and the second appliance includes a function selection unit for reading the stored proprietary data and the selection value and transmitting the selection value to the first function selection means.

21. The device authentication system of claim 20, wherein the function selection unig further stores a table of priority ranking for the plurality of verification functions and selects the highest priority of the plurality of verification functions that can correspond to the first response data.

22. The device authentication system of claim 20, further including a transmission means for transmitting the proprietary data between the first and second appliance when the first authentication signal is generated.

23. The device authentication system of claim 19 further including in the second appliance a second challenge data transmitting means for generating a variable second challenge data that can be operated upon by anyone of the verification functions and transmitting the second challenge data to the first appliance, and a second comparing unit for receiving a second respond data, from the first appliance in response to the sending of the second challenge data to the first appliance, that is related to the second challenge data and comparing the second response data to determine if an operand with the same verification function was used to generate the first challenge data, whereby if the same verification function was used, a second authentication signal is generated, and the first appliance further includes means for storing the verification functions used to generate the first challenge data and means for generating a second respond data from the second challenge data and transmitting the second respond data to the second appliance.

24. The device authentication system of claim 23 further including a transmission means for transmitting the proprietary data between the first and second appliance when the first and second authentication signals are generated.

25. A method of authenticating a communication system between a first appliance and a second appliance, comprising the steps of:

generating a variable first challenge data and transmitting it from a first appliance to a second appliance;

selecting one of a predetermined plurality of verification functions stored in the second appliance, each verification function being different from another one;

generating a first response data by the second appliance using the selected verification function and the received first challenge data and transmitting it to the first appliance;

comparing the first response data in the first appliance by using the first challenge data and a plurality of the same predetermined verification functions which are also stored in the first appliance to determine if one of the stored verification functions was used to create the first response data;

issuing a first authenticating signal only if the comparing step finds a matching verification function;

generating a variable second challenge data, upon receipt of the first authentication signal, and transmitting it from the second appliance to the first appliance;

generating a second response data by the first appliance using the same verification function determined in the comparing of the first response data and the second challenge data and transmitting it to the second appliance;

comparing the second response data in the second appliance by using the second challenge data and the selected verification function; and issuing a second authentication signal only if the comparing step finds a matching verification function.

26. The method of claim 25, wherein the selecting of one of the stored predetermined plurality of verification functions is made by decoding proprietary data to be transmitted after authentication is established and using an encoded selection value contained in the decoded data.

27. The method of claim 25, wherein a priority table of the plurality of verification functions is stored in each appliance and the highest priority verification function is used in preparing a first response data.

28. The method of claim 25, wherein the selecting of one of the stored predetermined plurality of verification functions is made initially by decoding proprietary data to be transmitted after authentication is established and using an encoded selection value contained in the decoded data, the initial verification function is used with the first challenge data and the resulting first response data is then reviewed with the remaining stored verification functions and the highest verification function that is applicable is then selected as the verification function to be stored for future comparisons.

* * * * *